(12) United States Patent
Kumagai et al.

(10) Patent No.: US 6,621,559 B1
(45) Date of Patent: Sep. 16, 2003

(54) ELECTRONIC LEVELING APPARATUS AND METHOD OF CONTROLLING FOCUSING OPERATION OF THE ELECTRONIC LEVELING APPARATUS

(76) Inventors: Kaoru Kumagai, 75, 1, Hasunuma-Cho, Itabashi-Ku, Tokyo, 174 (JP); Toshio Sasakura, 75-1, Hasunuma-Cho, Itabashi-Ku, Tokyo, 174 (JP)

(*) Notice: Subject to any disclaimer, the term of this patent is extended or adjusted under 35 U.S.C. 154(b) by 0 days.

(21) Appl. No.: 09/618,430

(22) Filed: Jul. 18, 2000

(30) Foreign Application Priority Data

Jul. 19, 1999 (JP) .......................................... 11-205433

(51) Int. Cl.$^7$ ................................................ G01C 3/08
(52) U.S. Cl. ...................................................... 356/4.05
(58) Field of Search ............................ 356/4.03, 4.04, 356/4.05, 4.08, 400, 401; 33/293, 294; 250/201.7; 359/399, 697, 694

(56) References Cited

U.S. PATENT DOCUMENTS

| | | | | |
|---|---|---|---|---|
| 5,194,906 A | * | 3/1993 | Kimura et al. .................. 356/5 |
| 5,537,200 A | * | 7/1996 | Kumagai et al. ........... 356/4.01 |
| 5,537,201 A | * | 7/1996 | Kumagai et al. ........... 356/4.08 |
| 5,742,378 A | * | 4/1998 | Kumagai et al. ........... 356/4.08 |
| 5,777,899 A | * | 7/1998 | Kumagai ................ 364/571.02 |
| 5,886,340 A | * | 3/1999 | Suzuki et al. ............. 250/201.7 |
| 6,130,417 A | * | 10/2000 | Hashimoto ............... 250/201.2 |

* cited by examiner

Primary Examiner—Thomas G. Black
Assistant Examiner—Deandra M. Hughes
(74) Attorney, Agent, or Firm—Baker Botts LLP (57) ABSTRACT

The present invention intends to provide an electronic leveling apparatus or the like in which a pattern image of a staff received on a photoelectric converting unit is converted into an electric signal, a peak of contrast is detected based on the obtained electric signal, and thus focusing control is carried out. According to the arrangement of the present invention, there is provided an electronic leveling apparatus for use with a staff as a target of collimation having a pattern arrayed in the longitudinal direction thereof for determining level difference, in which a telescope optical system including a focusing optical system forms an image of the pattern, a photoelectric converting unit receives a light beam from the telescope optical system and converts the light beam into a signal of the pattern, a focusing drive unit forms the pattern on the photoelectric converting unit, and a focusing control unit detects a focusing status and controls the focusing drive unit based on the output signal from the photoelectric converting unit.

2 Claims, 9 Drawing Sheets

FIG. 9

ELECTRONIC LEVELING APPARATUS AND METHOD OF CONTROLLING FOCUSING OPERATION OF THE ELECTRONIC LEVELING APPARATUS

BACKGROUND OF THE INVENTION

The present invention relates to an electronic leveling apparatus and a method of controlling the focusing operation of the electronic leveling apparatus. More particularly, the present invention relates to an electronic leveling apparatus or the like in which a pattern image of a staff received on a photoelectric converting unit is converted into an electric signal, a peak of contrast is detected based on the obtained electric signal, and thus focusing control is carried out.

A measurement of level difference is carried out by using a staff and a level measuring device. The staff is provided with a scale and numerical values indicating the height from the ground on which the staff stands. The level measuring device is arranged to collimate the horizontal direction.

The height of a target point is determined in such a manner that a benchmark point (a point of which height is given) or a known point is used as a reference and then level difference between the benchmark or the known point and the height of the target point is measured. To determine the height of the target point accurately, the distance between the surveying point to the target point is divided into sections of a predetermined length, the level measuring device is provided at the midst point of the section, and level difference is obtained by reading the scale of the staffs positioned in the front and rear direction of the level measuring device. This operation is repeated to measure the level difference.

When the level measuring device is utilized, the telescope is focused on the staff to collimate the scale of the staff. For this reason, the accuracy in reading the scale of the staff depends on the degree of skill of the operator. That is, the accuracy of measurement varies depending on the degree of skill of the operator. The electronic leveling apparatus is developed for the purpose of removing accuracy variation depending on the degree of skill of the operator and improving an efficiency of measurement.

Also, the electronic leveling apparatus is arranged as a level measuring device and utilized together with a staff. Since the electronic leveling apparatus reads the scale of the staff in an electronic manner, the electronic leveling apparatus is arranged to convert an optically sensed signal into an electric signal, convert the electric signal into a numerical digit and display the numerical digit on a display device. Since the numerical digit is memorized into a memory device directly, note taking or key input operation can be obviated.

The staff utilized together with the electronic leveling apparatus is substantially the same as the conventional staff. However, the staff is provided with a patterned scale and hence the scale can be read in an electronic manner. Thus, the scale cannot always be read by the surveyor. However, any operator can operate the measuring at a degree of skill equivalent to the skill of an expert so long as the operator has a certain knowledge. That is, the minimum requirement for the operator is that the operator directs the electronic leveling apparatus toward the staff and focuses the apparatus on the staff.

According to the conventional automatic focusing apparatus, due to an error caused in the assembly stage, humidity and temperature of surrounding atmosphere and so on, an optical distance can be fluctuated relative to a designed value. Alternatively, the focal position of a lens can vary. These fluctuation or variation will cause a positive or negative error in focusing amount (defocusing amount).

It is true that the conventional electronic leveling apparatus allows an operator to carry out surveying operation at a skill equivalent to the skill of an expert so long as the operator has a certain knowledge, and hence any problem can be removed by an electronic manner in terms of the reading of the scale on the staff. However, the conventional electronic leveling apparatus encounters a problem that an ordinary operator can achieve accuracy lower than accuracy which is achievable by an expert in terms of focusing operation. In other words, an accurate measuring operation requires that focusing adjustment shall be carried out while the main body of the electronic leveling apparatus is maintained in a horizontally collimated state.

The applicant of the present invention has developed an automatic focusing electronic leveling apparatus. However, the electronic leveling apparatus suffered from problems of focusing operation in terms of time and cost, and hence the developed automatic focusing electronic leveling apparatus cannot provide utility from a practical viewpoint.

Further, the conventional automatic focusing apparatus suffers from a problem of positive or negative error in the focusing amount that comes from the assembly stage, humidity and temperature of surrounding atmosphere and so on, with the result that an image cannot be formed on a photosensitive element. Thus, the focal position different from a theoretical focal position could be calculated in a wrong manner, which fact leads to a defocus state.

SUMMARY OF THE INVENTION

According to the present invention, there is provided an electronic leveling apparatus for use with a staff as a target of collimation having a pattern arrayed in the longitudinal direction thereof for determining level difference, in which a telescope optical system including a focusing optical system forms an image of the pattern, a photoelectric converting unit receives a light beam from the telescope optical system and converts the light beam into a signal of the pattern, a focusing drive unit forms the pattern on the photoelectric converting unit, and a focusing control unit detects a focusing status and controls the focusing drive unit based on the output signal of the photoelectric converting unit.

DESCRIPTION OF PREFERRED EMBODIMENTS

An embodiment of the present invention will hereinafter be described with reference to drawings.

An embodiment of a surveying apparatus according to the present invention consists of an electronic leveling apparatus 1 and a staff 2 for use with the electronic leveling apparatus 1.

Figure 2:
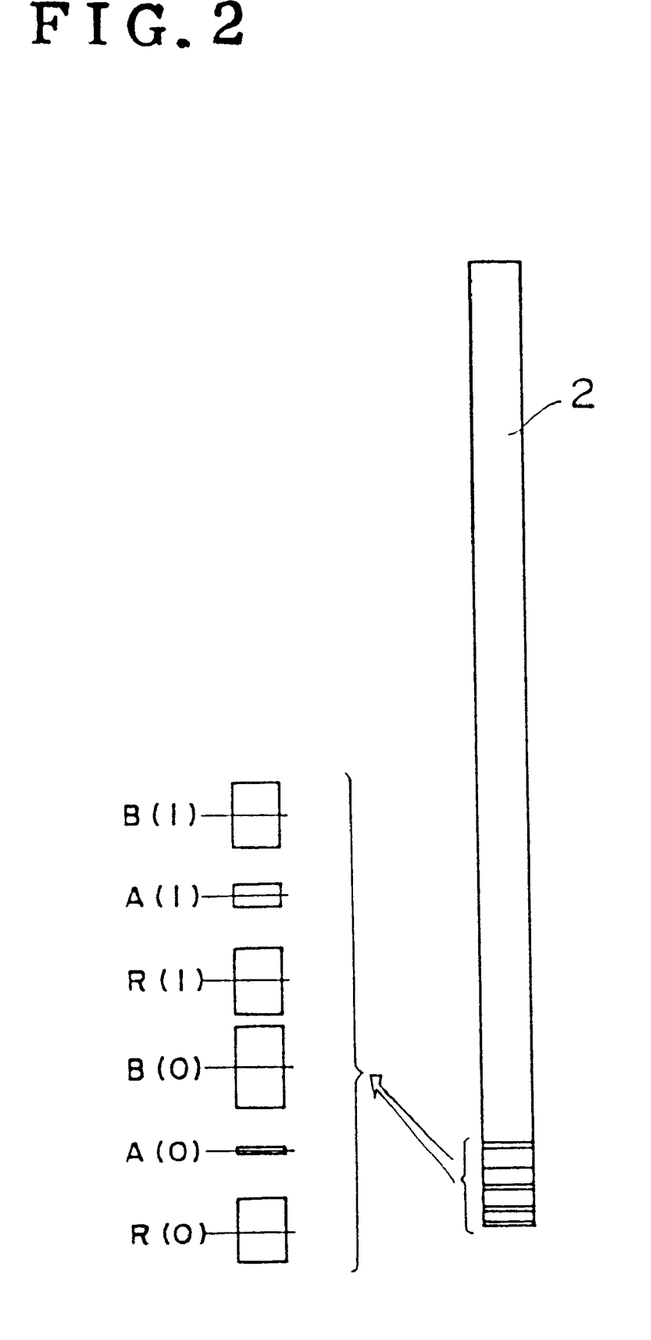
FIG. 2 is a diagram illustrative of a staff 2 for use with the electronic leveling apparatus 1 as the embodiment of the present invention.

As shown in FIG. 2, the staff for use with the electronic leveling apparatus 1 is a staff having a scale provided thereon in which a first pattern A, a second pattern B and a third pattern R are repeatedly provided at a regular interval (p). That is, the three kinds of patterns constitute a set of pattern block and each block is formed in series on the scale. In this case, the leftmost located block is defined as a zero block and denoted as R(0), A(0), B(0). In a similar fashion, R(1) A(1), B(1), R(2), A(2), B(2), and so on are repeatedly provided. Since all patterns are repeatedly provided at the regular interval, p, a signal corresponding to the interval can be utilized as a reference signal.

The first pattern A is arranged such that the width of a black portion is modulated at a period of 600 mm. The second pattern B is arranged such that the width of the black portion is modulated at a period of 570 mm. The third pattern R is arranged such that the width of the black portion is fixed to 8 mm.

Now, a principle for determining a horizontal position of the staff 2 for use with the electronic leveling apparatus will be described.

As mentioned above, the first pattern A is arranged such that the width of the black portion is modulated at a period of 600 mm within a range of 0 to 10 mm. Similarly, the second pattern B is arranged such that the width of the black portion is modulated at a period of 570 mm.

Thus, the period of modulation of the first pattern A and the period of modulation of the second pattern B are slightly different from each other, and hence a similar pattern having a period of a distance corresponding to the least common multiple of the periods will appear in the view of telescope. In this example, the period of an appearing pattern becomes the least common multiple of the period of 600 mm and the period of 570 mm, i.e., 11400 mm. Thus, the phase difference between a signal deriving from the first pattern A and a signal deriving from the second pattern B will vary from 0 to $2\pi$ within a range of 0 to 11400 mm.

Next, description will be made on how a distance can be measured by reading the pattern of the staff with the above-described electronic leveling apparatus 1.

Figure 1:
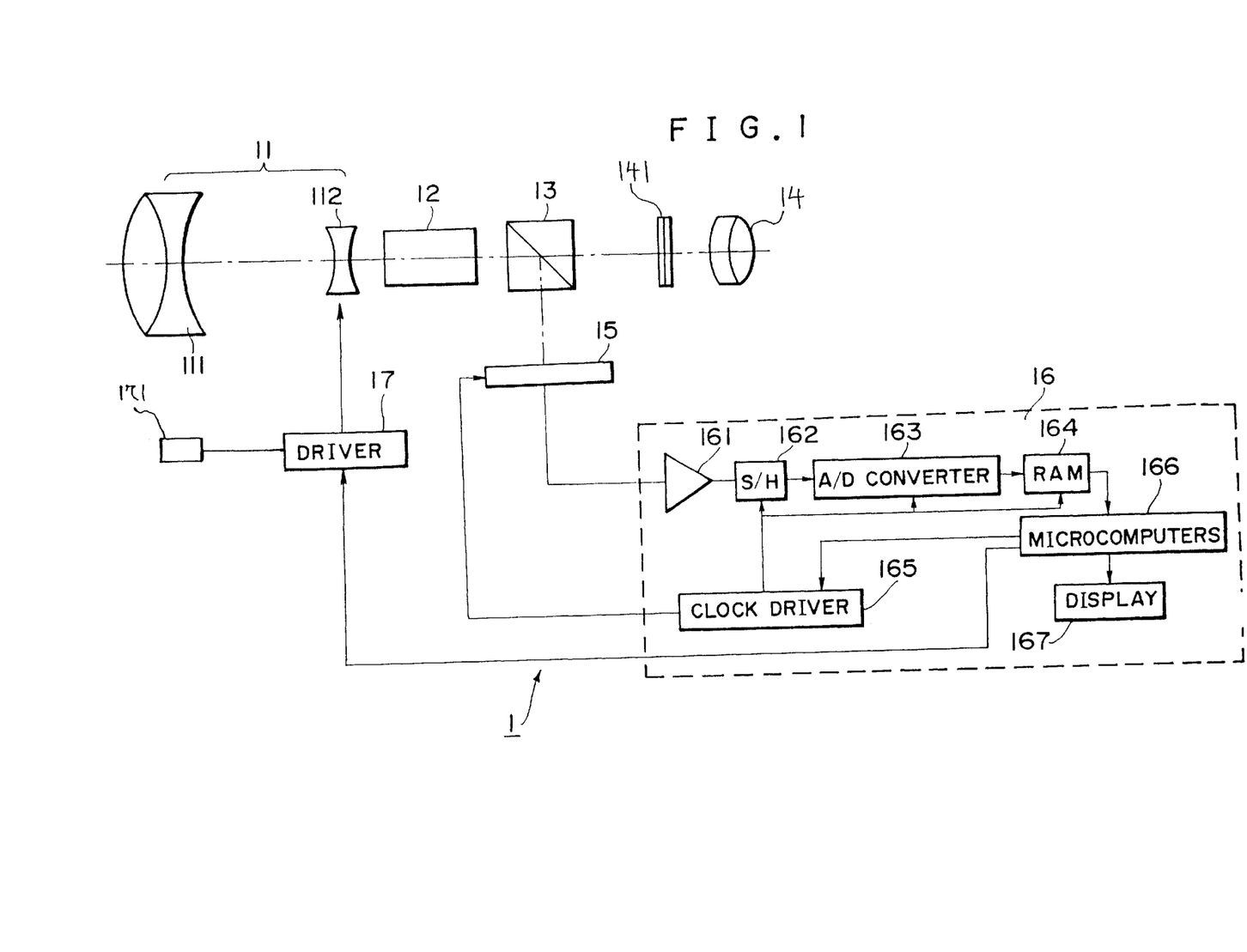
FIG. 1 is a diagram showing an arrangement of an electronic leveling apparatus 1 as an embodiment of the present invention.

A signal width is directly determined from clear images of the first pattern A, the second pattern B and the third pattern R. An output signal is subjected to differentiation so as to determine a rising edge and a falling edge of a pattern which is received on a linear sensor 15. The width of the black portion can be detected by determining the distance between the edges. Further, a bit corresponding to the center of the black portion is determined. An interval between such bits designates the pitch p of the pattern A, the pattern B and the pattern R, which are arrayed at a regular interval. Thus, the signal deriving from the bits can serve as a reference signal.

Since the width of the reference signal corresponds to 10 mm on the staff 2 for the electronic leveling apparatus 1, an address position (m-th bit) corresponding to the horizontal position can be obtained by the following equation.

$$H_1 = ((m - N_f)/(N_b - N_f)) * 10 \qquad \text{First Equation}$$

where $N_f$ ($N_f$-th bit) represents a forward reference signal and $N_b$ ($N_b$-th bit) represents a backward reference signal (fine measurement).

Further, an approximate distance between the electronic leveling apparatus 1 and the staff 2 for use with the electronic leveling apparatus 1 can be obtained from the distance between the starting position and ending position of the reference signal.

Then, the third pattern R having a constant width is recognized. Since the three patterns are arrayed in the order of the third pattern R, the first pattern A and the second pattern B, the correspondence of the third pattern R, the first pattern A and the second pattern B can be determined by carrying out decimation at every three black portions. Further, the address position (m-th bit) containing the reference signal of the linear sensor 15 corresponding to the horizontal position determines the order of location of each of blocks of the third pattern R, the first pattern A and the second pattern B (coarse measurement). The horizontal position can be determined by making the digit deriving from the fine measurement coincident with the digit deriving from the coarse measurement.

According to the conventional manner, a far distance was measured based on Fourier transform while a near distance is measured based on edge detection. However, according to the manner of the present invention, measurement is carried out based on only the edge detection, whereby switching between the far-distance measuring mode and the near-distance measuring mode is obviated.

An embodiment of the present invention will further be described hereinafter with reference to the drawings.

Figure 3:
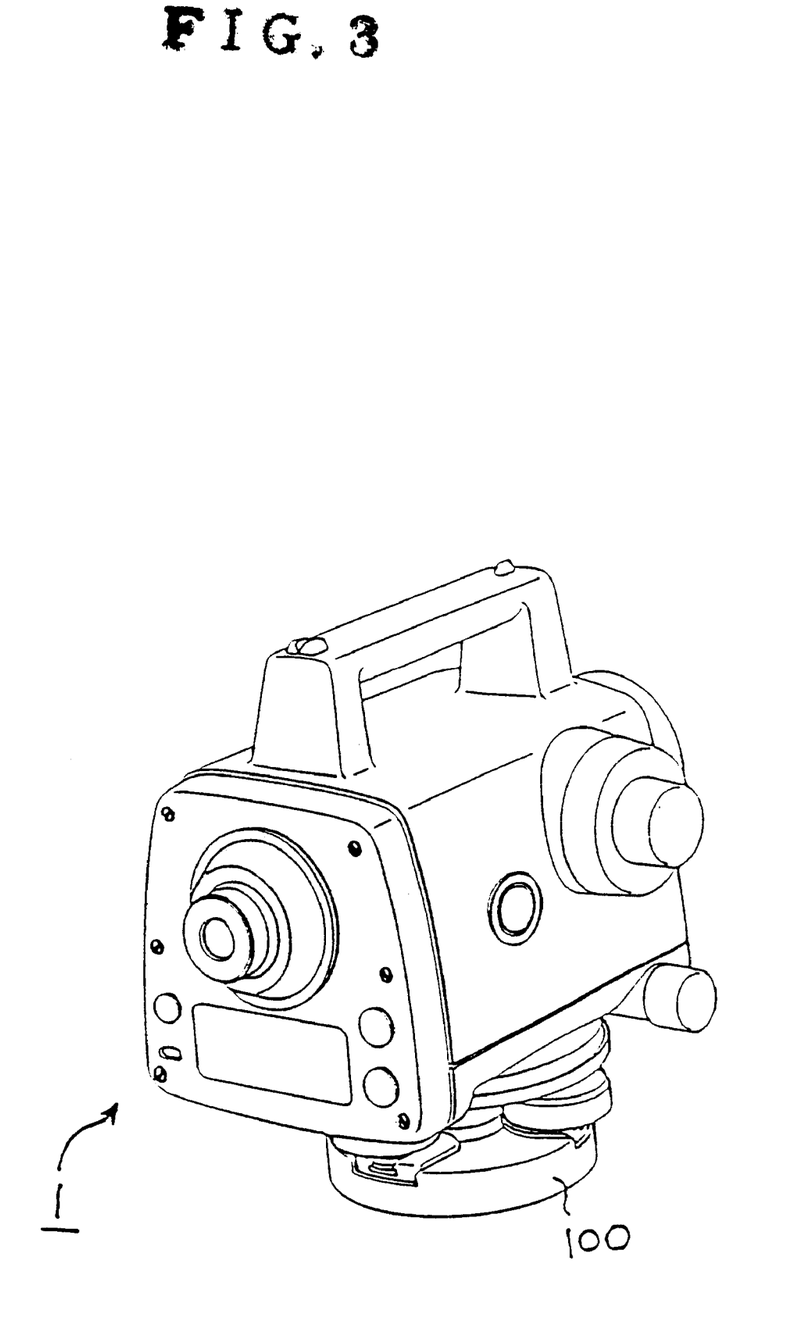
FIG. 3 is an oblique view of an outward appearance of the electronic leveling apparatus as the embodiment of the present invention.

As shown in FIGS. 1 to 3, the surveying apparatus of the present embodiment consists of the electronic leveling apparatus 1 and the staff 2 for use with the electronic leveling apparatus. As shown in FIG. 3, the electronic leveling apparatus 1 is disposed on a leveling device 100. Further, as shown in FIG. 1, the electronic leveling apparatus 1 is composed of an objective lens unit 11, a compensator 12, a beam splitter 13, an eyepiece unit 14, the linear sensor 15, an arithmetic processing unit 16 and a drive unit 17.

The objective lens unit 11 is utilized for forming an image of the pattern of the staff 2 for use with the electronic leveling apparatus 1. The objective lens unit 11 of the present embodiment is formed of an objective lens 111 and an internal lens 112. The internal lens 112 can be moved so that the pattern image of the staff 2 is focused on a focusing plate 141 and the linear sensor 15.

It is natural to say that the focusing plate 141 and the linear sensor 15 are placed in a conjugate relationship with each other in terms of formation of the image. Therefore, the internal lens 112 plays a part of a focusing drive unit. The compensator 12 is an automatic compensating mechanism for recovering the horizontal level of the line of collimation even if an optical axis of the electronic leveling apparatus 1 is somewhat tilted. The mechanism varies the horizontal light beam in the upper or lower direction to form an image. The beam splitter 13 splits an incident light beam into a beam directed to the eyepiece unit 14 and a beam directed to the linear sensor 15. The eyepiece unit 14 is utilized when a surveyor views the staff 2 through the electronic leveling apparatus 1. The focusing plate 141 is disposed before the eyepiece unit 14 and has a cross hair with respect to a collimation axis, whereby a collimation image can be formed thereon together with the cross hair. Thus, the collimation direction can be determined by bringing the image into coincidence with the cross hair. Furthermore, although not shown, an erecting optical system formed of a reflecting mirror or a prism is disposed before the focusing plate 141.

The linear sensor 15 corresponds to a pattern detecting unit in which the pattern image of the staff for use with the electronic leveling apparatus 1 formed by the objective lens unit is converted into an electric signal. The level is detected and automatic focusing is carried out based on the detected signal. According to the present embodiment, the linear sensor 15 is formed of a CCD linear sensor. The linear sensor 15 can employ any kind of sensor so long as the sensor has a structure having photodiodes arrayed in at least one dimensional fashion. The linear sensor 15 is disposed so that the longitudinal direction thereof is in parallel with the staff which stands perpendicularly to the optical axis. In this way, the components of the electronic leveling apparatus 1 require only a small area of placement. The linear sensor 15 also corresponds to a photoelectric converting unit.

Figure 4:
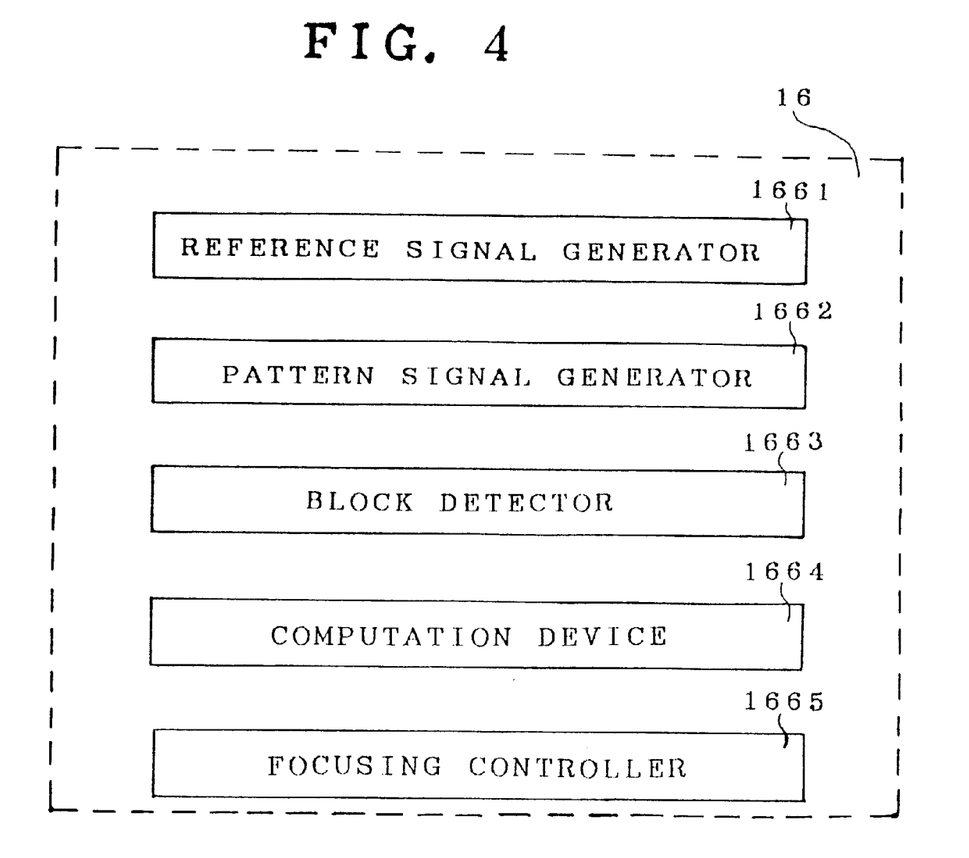
FIG. 4 is a diagram showing an arrangement of arithmetic processing means 16 of the electronic leveling apparatus as the embodiment of the present invention.

The arithmetic processing means 16 is composed of an amplifier 161, a sample-and-hold circuit 162, an analog-to-digital converter 163, a RAM 164, a clock driver 165, a microcomputer 166, and a display device 167. The drive unit 17 is a unit for moving the internal lens 112.

The drive unit 17 is a unit for moving the internal lens 112 by a predetermined amount in accordance with the result of the arithmetic processing of the arithmetic processing means 16. The drive unit 17 of the present embodiment employs an arc motor. However, any drive means such as an ultrasonic motor or the like can be employed so long as the drive means can move the internal lens 112. The drive means 17 is attached with an encoder 171.

As mentioned above, the staff 2 for use with the electronic leveling apparatus 1 has a set of patterns arrayed in the longitudinal direction of the staff as shown in FIG. 2. That is, the patterns are composed of the first pattern A, the second pattern B and the third pattern P arrayed at the regular interval, (p). Now, the arithmetic processing means 16 provided in the electronic leveling apparatus 1 of the present embodiment will be described in detail.

The amplifier 161 amplifies an electric signal supplied from the linear sensor 15. The sample-and-hold circuit 162 samples a value of the amplified electric signal and holds the same in response to a timing signal supplied from the clock driver 165. The analog-to-digital converter 163 is a unit for producing a digital signal based on the sampled and held electric signal. The RAM 164 is a memory for storing therein the digitized signal produced by the analog-to-digital converter 163. Further, the microcomputer 166 carries out various arithmetic processing.

The objective lens unit 11, the compensator 12, the beam splitter 13 and the eyepiece unit 14 constitute the telescope optical system. The linear sensor 15 corresponds to a photoelectric converter.

The function of the microcomputer 166 in the present embodiment will hereinafter-be described with reference to FIG. 4. The arithmetic processing means 16 is composed of a reference signal forming unit 1661, a pattern signal forming unit 1662, a block detecting unit 1663, a calculating unit 1664, and a focusing control unit 1665. The reference signal forming unit 1661 subjects an electric signal obtained from the linear sensor 15 to a differential operation to detect a rising edge and a falling edge of the signal, and then forms a reference signal based on the detected edges.

The pattern signal forming unit 1662 forms a first pattern signal, a second pattern signal and a third pattern signal based on the decimation process effected at every three patterns.

The block detecting unit 1663 determines the order of the block corresponding to the horizontal position, by comparing a width $D_A$ of the first pattern signal A with the width $D_B$ of the second pattern signal B. The calculating unit 1664 is arranged to calculate a level difference based on a specified block near the line of collimation.

The focusing control unit 1665 controls the internal lens 112 through the drive unit 17 so that an image of the staff is focused on the linear sensor 15. A contrast system is employed as a principle of the automatic focusing of the present embodiment. However, an employed system is not limited to the contrast system but any system can be employed.

The focusing control unit 1665 moves the internal lens 112 in the forward and backward directions so as to detect a position at which the edge of the image on the linear sensor 15 exhibits the highest contrast. Thus, the focusing control unit 1665 finds the focal point.

The display device 167 is a device for displaying the level difference calculated by the calculating unit 1664. Therefore, the display device may be formed of any display means such as a liquid crystal display. Further, the display device may be arranged to supply a signal to an external memory means.

Figure 5:
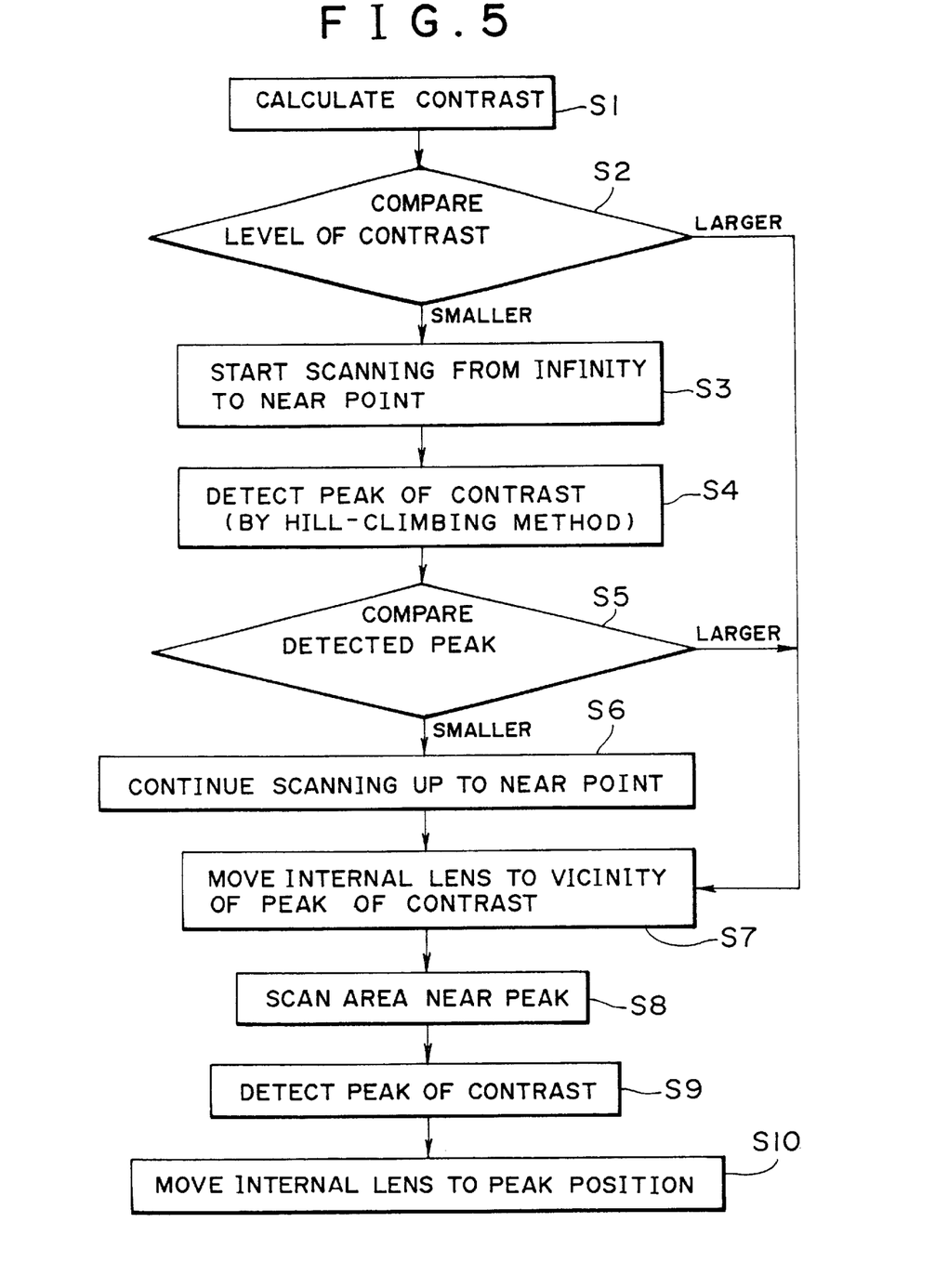
FIG. 5 is a flowchart of the operation of the electronic leveling apparatus as the embodiment of the present invention.

A focusing operation of the present embodiment arranged as described above will hereinafter be described with reference to FIG. 5.

Initially, at step 1 (hereinafter referred to as S1), the focusing control unit 1665 carries out an arithmetic operation of the contrast based on an image signal obtained from the linear sensor 15.

At step S2, the arithmetic processing unit 16 determined whether the value of the contrast exceeds a predetermined value (threshold value) or not. If it is determined at step S2 that the value of contrast does not reach the predetermined value (threshold value), the processing proceeds to step S3 in which the arithmetic processing means 16 moves the internal lens 112 through the drive unit 17. At step S3, scanning in the coarse measurement mode is started so that the focal point of the internal lens 112 is moved from the infinity to the near distance.

At step S4, the arithmetic processing means 16 detects a peak of contrast. This detection is carried out in such a manner that a peak of a convex curve of the contrast is detected to determine the peak of the contrast (hill-climbing method).

Further, at step S5, the arithmetic processing means 16 determines whether the value of the contrast exceeds the predetermined value or not. If it is determined that the contrast does not reach the predetermined value, then the processing proceeds to step S6 in which the arithmetic processing means 16 forces the internal lens 112 to continue the scanning in the near direction.

At step S7, the arithmetic processing means 16 moves the internal lens through the drive means 17 to a position where the peak of the contrast is detected in the coarse measurement mode. This process of position detection utilizes a detecting signal of the encoder 171.

At step S2, if the value of the contrast reaches the predetermined value (threshold value), scanning in the coarse measurement mode need not be carried out. Thus, the processing proceeds to step S7. Similarly, if the value of the contrast reaches the predetermined value (threshold value) at step S5, scanning in the coarse measurement mode also need not be carried out. Thus, the processing proceeds to step S7. As a result, it becomes possible to remarkably shorten the time it takes to carry out the focusing operation. If the threshold value is set to the value of the contrast of the staff, the time it takes to carry out the focusing operation to the staff can be shortened, with the result that the working time can be shortened.

At step S7, the internal lens 112 is brought to a position where the peak of contrast is detected. Thereafter, the processing proceeds to step S8 where a scanning in the fine measurement mode is effected at the vicinity of the position where the peak of contrast is detected. The scanning carried out in step S8 is arranged to detect the peak of contrast in more accurate fashion than the scanning carried out in step S3. Thus, accurate peak detection can be more effectively carried out.

If the scanning in the fine mode is completed, the processing proceeds to step S9 where the peak of contrast is detected in accurate fashion.

At step S10, the arithmetic processing unit 16 moves the internal lens 112 through the drive unit 17 based on the position of the peak of contrast which has been detected at step S9. Thus the automatic focusing operation is completed. Also, in the position determining process, the detecting signal of the encoder 171 is utilized.

Figure 6:
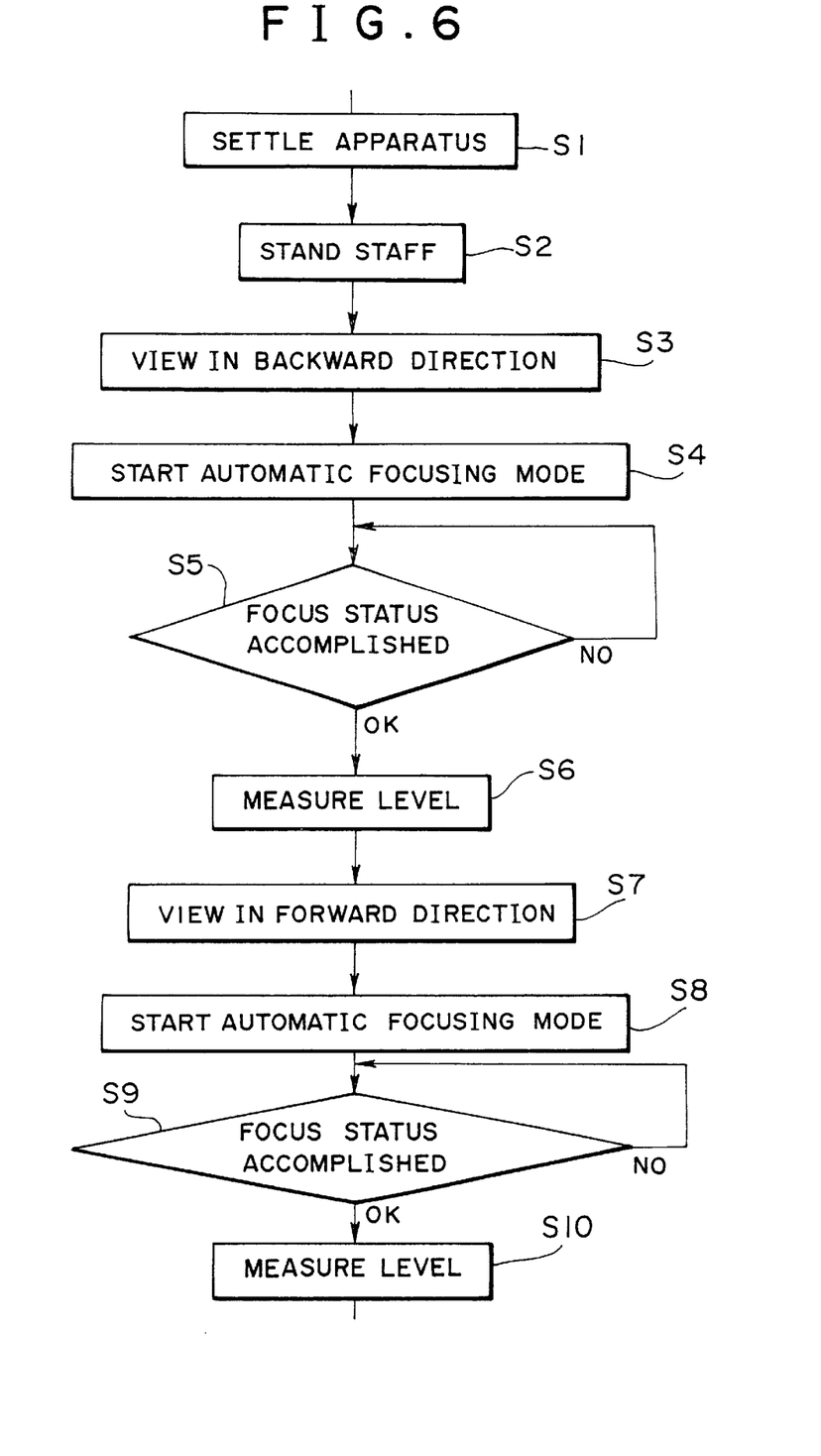
FIG. 6 also is a flowchart of the operation of the electronic leveling apparatus as the embodiment of the present invention.

A manner of survey using the electronic leveling apparatus 1 and the staff 2 for use with the electronic leveling apparatus 1 will hereinafter be described concretely with reference to FIG. 6.

Initially, at step S1 (hereinafter referred to as S1), the electronic leveling apparatus is settled. Then, at step S2, the staff 2 for use with the electronic leveling apparatus 1 is settled at a point of measurement. Thereafter, at step S3, backward viewing is carried out. In this case, the backward viewing means collimation in the backward direction relative to the progressing direction. Also, forward viewing means collimation in the forward direction relative to the progressing direction.

At step S4, the automatic focusing operation is executed by means of the focusing operation described above. In the automatic focusing operation, to observe a rate of detecting the contrast, the range of detection of the linear sensor 15 is set to be narrow.

At step S5, it is determined whether the automatic focusing operation is completed or not. If it is determined that the automatic focusing operation is completed, the processing proceeds to step S6 where a height measurement (level measurement) is carried out. On the other hand, if it is determined at step S5 that the automatic focusing operation is not completed, the automatic focusing operation is retried. When the level measurement is carried out at step S6, the range of detection of the linear sensor 15 is set to be wide for increasing the accuracy in height measurement.

At step S7, forward viewing is carried out. At step S8, the automatic focusing is executed by the above-described focusing operation. When this automatic focusing operation is carried out, the range of detection for the linear sensor 15 is set to be narrow.

At step S9, it is determine whether the automatic focusing is completed or not. If it is determined that the automatic focusing is completed, the processing proceeds to step S10 where a height measurement (level measurement) is carried out. On the other hand, if it is determined at step S9 that the automatic focusing operation is not completed, the automatic focusing operation is retried. When the level measurement is carried out at step S10, the range of detection of the linear sensor 15 is set to be wide.

According to the automatic focusing operation of the present embodiment arranged as described above, the internal lens 112 is moved from a far point to a near point, and a peak of contrast is searched in accordance with the signal detected by the linear sensor 15. If focusing operation is carried out at every collimation using the staff 2 for the electronic leveling apparatus 1, it will take a lot of time in measurement, with the result that it becomes impossible to obtain an advantage of the automatic focusing relative to a manual focusing.

However, it is noted that when leveling survey for determining a level difference is carried out, a level measuring apparatus is settled at substantially the center of a section of distance under measurement. Therefore, the length between the forward end and the backward end of the level measuring apparatus is small enough to be neglected with respect to the distance from the apparatus to the staff under measurement. Therefore, there is almost no necessity for the internal lens 112 to be moved.

For this reason, if the linear sensor 15 generates a detected signal indicative of a contrast exceeding a predetermined value, the measurement in the fine mode may be carried out within a narrow range. Further, a half distance of one section is about 20 m. A general telescope has a characteristic such that smaller the focal distance becomes, larger the distance that the internal lens 112 travels for focusing while larger the focal distance becomes, smaller the distance that the internal lens 112 travels for focusing. In this way, if an object under measurement is located more than 10 m away from the telescope, the focal distance of the telescope becomes substantially equivalent to infinity. Therefore, if an object under measurement is located far away from the telescope, merely a minute adjustment near the infinity is satisfactory, with the result that high speed focusing operation can be accomplished.

A compensating mechanism of a defocusing amount will hereinafter be described.

Figure 7:
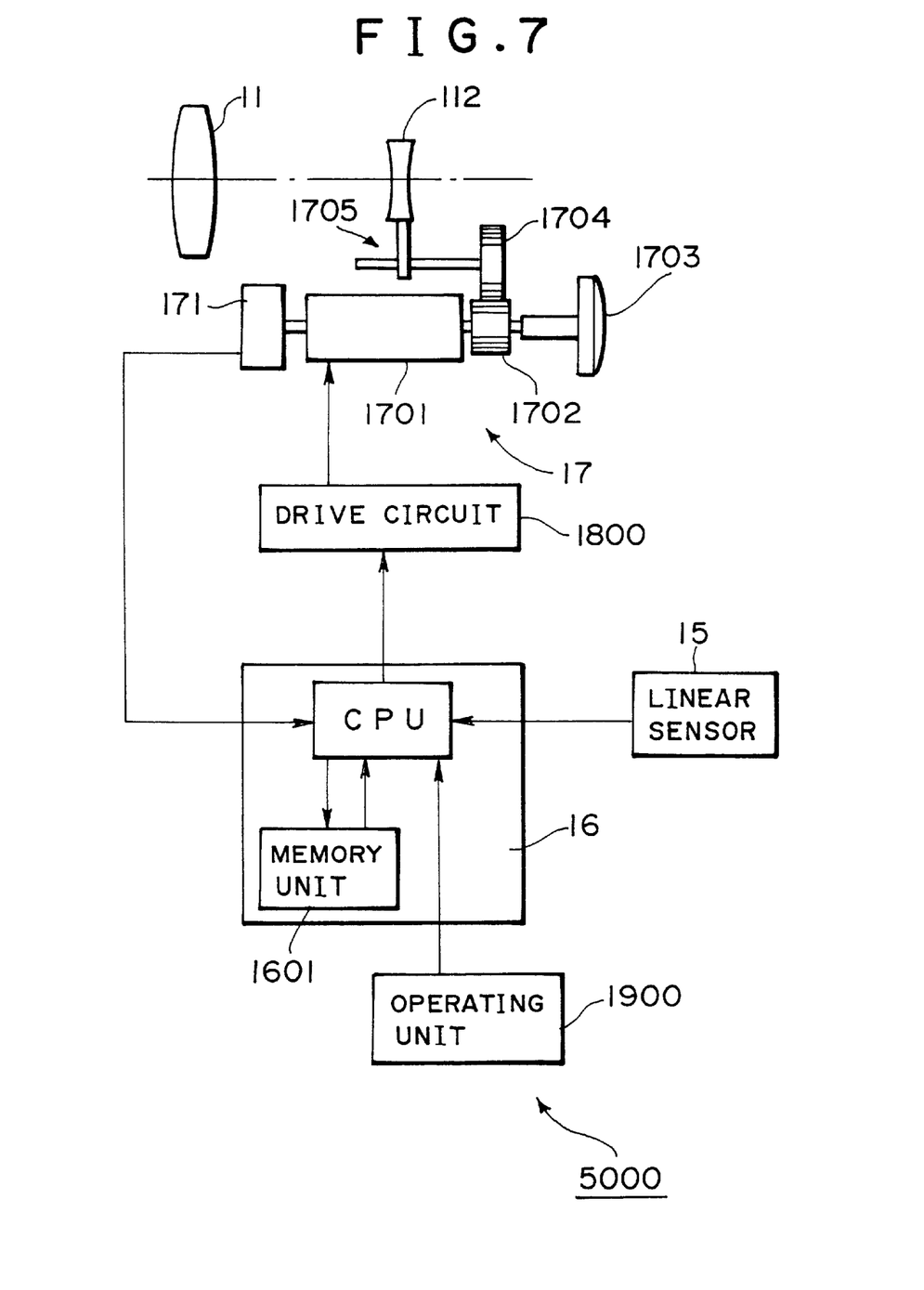
FIG. 7 is a diagram showing a mechanism for correcting a defocus amount.

FIG. 7 is a diagram for describing an arrangement of the compensating mechanism 5000 of the defocusing amount.

The compensating mechanism 5000 of the defocusing amount is composed of the internal lens 112, the drive unit 17, the encoder 171, the arithmetic processing means 16 and so on.

The drive unit 17 is composed of a focusing drive motor 1701, a drive gear 1702, a manual focus knob 1703, a driven gear 1704, and a slide mechanism 1705. The drive unit 17 corresponds to the focusing drive unit. Further, the manual focus knob 1703 corresponds to a manual focus member.

The focusing drive motor 1701 is a power supply for moving the internal lens 112. A drive circuit 1800 is arranged to control and drive the focusing drive motor 1701 in accordance with a control signal from the arithmetic processing means 16.

When the focusing drive motor 1701 is rotated, the drive gear 1702 coupled to a rotating shaft thereof is also rotated. Thus, the driven gear 1704 meshed with the drive gear 1702 is rotated, with the result that the driven gear 1704 drives the slide mechanism 1705. The slide mechanism 1705 is formed of a rod member having a screw formed thereon. When the driven gear 1704 is rotated, the slide mechanism 1705 can move the internal lens 112 in the forward and backward directions.

The rotating shaft of the focusing drive motor 1701 is attached with the encoder 171. Thus, data indicative of a moving amount of the internal lens 112 can be obtained from the encoder 171. The data is supplied to the arithmetic processing means 16.

The rotating shaft of the focusing drive motor 1701 is also attached with the manual focus knob 1703. If obtained image is blurred after the focusing operation, it is expected that focus deviation is caused, leading to a defocus condition. An operator of the surveying apparatus operates the manual focus knob 1703 to make more clear focus condition manually. The correcting value of the defocusing amount can be supplied from the encoder 171 to the arithmetic processing means 16. As a result, the arithmetic processing means 16 memorizes the correcting value of the defocusing amount, and the following processing can be corrected based on the correcting value.

The arithmetic processing means 16 is provided with a memory unit 1601 for storing therein the correcting value of the defocusing amount. Further, the arithmetic processing unit 16 is attached with an operating unit 1900 through which an operator of the surveying apparatus can input an operation command or the like.

That is, the arithmetic processing means 16 recognizes the moving amount of the internal lens 112 based on the operation of the manual focus knob 1703, and corrects the defocusing amount of the focusing control.

Figure 8:
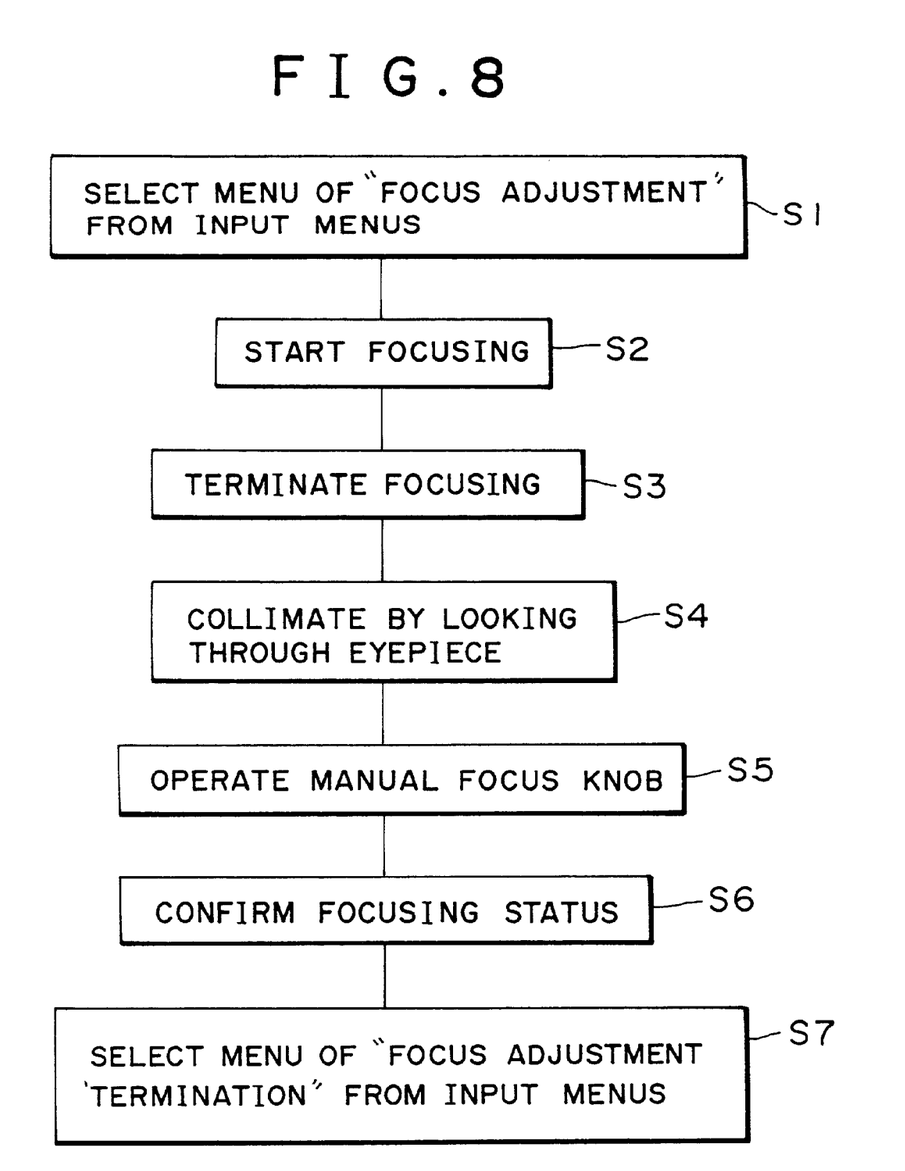
FIG. 8 is a flowchart of the operation of the mechanism for correcting a defocus amount.

An operation of the correcting mechanism of the defocusing amount according to the present embodiment will hereinafter be described with reference to FIG. 8.

Initially, at step S1 (hereinafter referred to as S1), an operator of the apparatus operates the operating unit 1900 to select a menu of "focus adjustment" from input menus.

Then, at step S2, the electronic leveling apparatus executes an automatic focusing described above. If the focusing operation is completed at step S3, then the automatic focusing mode is terminated. At step S4, the operator carries out collimation by using the objective unit 11. At step S5, focus adjustment is effected by operating the manual focus knob 1703.

At step S6, if the operator confirms that the focusing operation is completed as a result of step S5, the processing proceeds to step S7. In step S7, the operator operates the operating unit 1900 to select a menu of "focus adjustment completion" from the input menus. As a result, data corresponding to the correction value of the defocusing amount is sent from the encoder 171 to the arithmetic processing means 16. The arithmetic processing means 16 stores the data corresponding to the correction value of the defocusing amount into the memory unit 1601. The correction value is utilized in the following focusing operation.

Accordingly, if the operator initially operates the manual focus knob 1703 to adjust focusing manually, the step of correction of the defocusing amount is brought into the following automatic mode executed by the arithmetic processing means 16.

Figure 9:
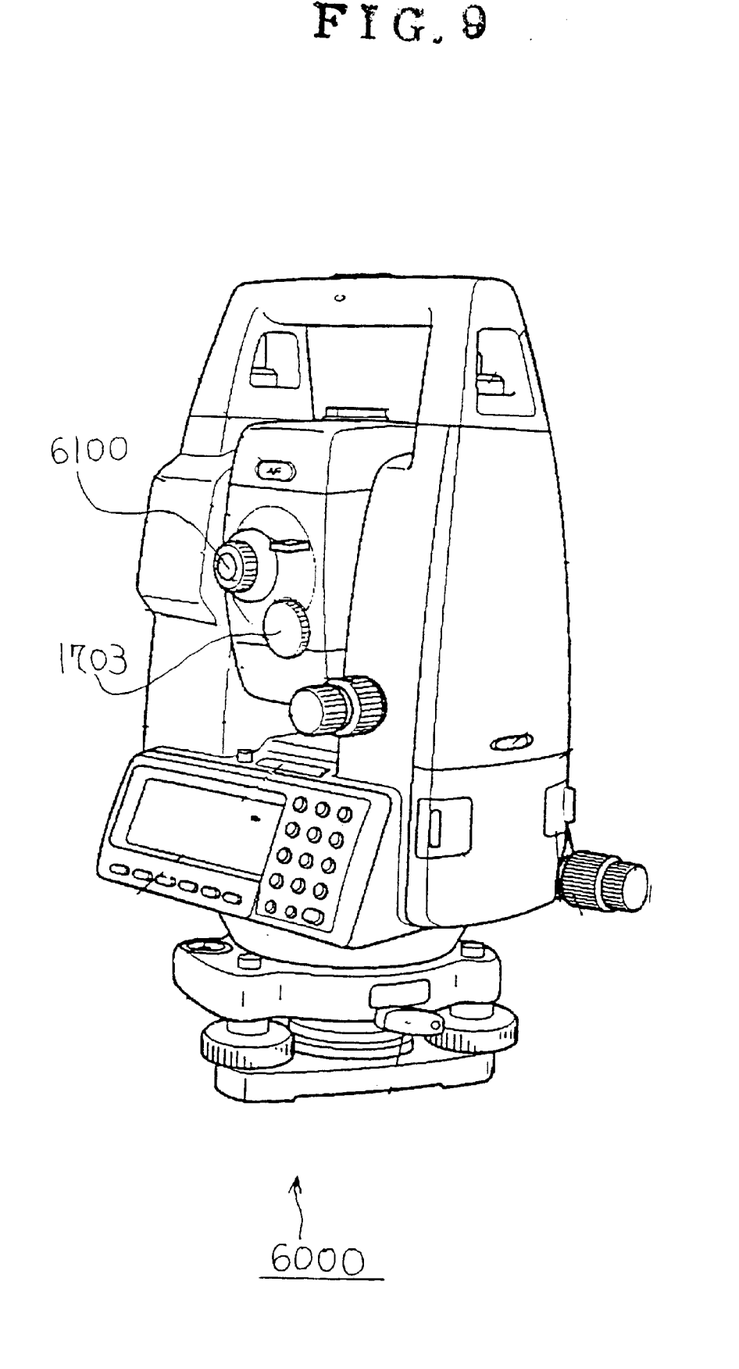
FIG. 9 is a diagram showing an outward appearance of the mechanism for correcting a defocus amount.

Although the above-described defocusing amount correcting mechanism is implemented by the electronic leveling apparatus 1 of the present embodiment, the mode of the defocusing amount correcting mechanism is not limited to the above implementation. That is, as shown in FIG. 9, the defocusing amount correcting mechanism can be implemented in a general electronic surveying apparatus 6000. The general electronic surveying apparatus 6000 is also attached with the manual focus knob 1703. Thus, an operator of the surveying apparatus 6000 can use a telescope eyepiece unit 6100 (i.e., the operator looks through the objective lens unit 11) and adjusts the focusing by operating the manual focus knob 1703. In this way, defocusing amount can be corrected.

According to the arrangement of the present invention described above, the focusing control unit is arranged to carry out measurement in the coarse measurement mode and the fine measurement mode. When a value for detecting the focusing status exceeds a predetermined value (threshold value), then the measurement in the coarse measurement mode is skipped and the focusing status is detected only in the fine measurement mode. In this measurement mode, the focusing drive unit moves the internal lens to form a pattern of the staff on the photoelectric converting unit based on the focal point obtained by the measurement in the fine measurement mode. When the value for detecting the focusing status does not reach the predetermined value (threshold value), then the focusing status is detected in the coarse measurement mode, the focusing drive unit brings the apparatus into the focal point detected in the coarse measurement mode, and the focusing status detection is carried out in the fine measurement mode. Thus, the focusing drive unit moves the internal lens to form a pattern of the staff on the photoelectric converting unit based on the focal point obtained by the measurement in the fine measurement mode. In this way, according to the arrangement of the present invention, if the value for detecting the focusing status exceeds the predetermined value (threshold value), then the measurement in the coarse measurement mode is skipped and the focusing status is detected only in the fine measurement mode. Therefore, it becomes possible to obtain a remarkable advantage that the focusing operation can be effected at a high speed.

Further, according to the electronic surveying apparatus of the present invention, the manual focus member is provided on the focusing drive unit and hence the operator of the apparatus can operate the manual focus member manually to correct the defocusing amount. Then, the arithmetic processing means corrects the defocusing amount upon the focusing control based on the operation of the manual focus member. Therefore, if the operator initially operates the manual focus member to adjust focusing manually, the step of correction of the defocusing amount is brought into the following automatic mode executed by the arithmetic processing means.

What is claimed is:

1. An electronic leveling apparatus comprising:
   a telescope optical system including a focusing optical system;
   a photoelectric converting unit for receiving a light beam from said telescope optical system and converting said light beam into a receiving light signal;
   a focusing drive unit for driving said focusing optical system;
   arithmetic processing means for controlling said focusing drive unit so as to form an image on said photoelectric converting unit;
   and further comprising,
   an encoder for detecting a position of said focusing optical system;
   position of said focusing optical system;
   a memory unit for storing said position of focusing optical system and a revised value of said focusing position adjusted by said manual focus member based on the detected signal of said encoder as a revised defocus amount; and
   said arithmetic processing means is characterized by revising the focusing position based on said revised value.

2. An electronic leveling apparatus according to claim 1, wherein by selecting focusing adjustment of operation menu, a memory unit stores a revised value of defocus amount, and in focusing controlling after this processing means revises defocus amount automatically.

* * * * *